(12) United States Patent
Wakumoto et al.

(10) Patent No.: US 7,359,383 B2
(45) Date of Patent: Apr. 15, 2008

(54) LOAD BALANCING WITH MESH TAGGING

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

(21) Appl. No.: 10/812,267

(22) Filed: Mar. 29, 2004

(65) Prior Publication Data

US 2005/0213582 A1  Sep. 29, 2005

(51) Int. Cl.
*H04L 12/28* (2006.01)
*H04L 12/56* (2006.01)
*H04L 1/00* (2006.01)
*H04J 1/16* (2006.01)
*H04J 3/14* (2006.01)

(52) U.S. Cl. .................... 370/395.3; 370/218; 370/389

(58) Field of Classification Search ............. 370/395.3, 370/392, 389, 400, 401, 395.42, 393, 235, 370/236, 252, 445, 396, 351, 238, 406, 217, 370/249, 254, 390, 432; 709/238, 232, 225, 709/224, 227, 243, 220; 718/105
See application file for complete search history.

(56) References Cited

U.S. PATENT DOCUMENTS

| | | | | |
|---|---|---|---|---|
| 5,938,736 A | * | 8/1999 | Muller et al. | 709/243 |
| 5,996,021 A | * | 11/1999 | Civanlar et al. | 709/238 |
| 6,493,318 B1 | | 12/2002 | Bare | |
| 6,577,600 B1 | | 6/2003 | Bare | |
| 6,580,715 B1 | | 6/2003 | Bare | |
| 2003/0099237 A1 | * | 5/2003 | Mitra et al. | 370/393 |
| 2004/0095928 A1 | * | 5/2004 | O'Neill et al. | 370/389 |
| 2004/0133634 A1 | * | 7/2004 | Luke et al. | 709/203 |
| 2004/0190454 A1 | * | 9/2004 | Higasiyama | 370/238 |
| 2004/0258062 A1 | * | 12/2004 | Narvaez | 370/389 |
| 2005/0078601 A1 | * | 4/2005 | Moll et al. | 370/218 |
| 2005/0108401 A1 | * | 5/2005 | Gonda | 709/227 |
| 2005/0201273 A1 | * | 9/2005 | Shimizu | 370/216 |
| 2005/0220096 A1 | * | 10/2005 | Friskney et al. | 370/389 |
| 2006/0002370 A1 | * | 1/2006 | Rabie et al. | 370/351 |

OTHER PUBLICATIONS

Cisco, "IPv6 over MPLS (Cisco 6PE)", copyright 1992-2002, Cisco Systems, Inc., pp. 2-30.*

* cited by examiner

*Primary Examiner*—Wing Chan
*Assistant Examiner*—Prenell Jones

(57) ABSTRACT

One embodiment disclosed relates to a method of load balancing traffic in a switching mesh. A packet is received at a switch of the mesh. A MAC destination address is gathered from the packet. An entry in a MAC address table is found with the MAC destination address, and a switch identifier associated with the MAC destination address is obtained. An entry in a switch table is found with the switch identifier, and data associated with the switch identifier is obtained. A hash function is used on field data from the packet to generate a hash value, and the hash value and the associated data are used to generate an index value. An entry in the tag table is found with the index value, and a path tag associated with the index value is obtained. The path tag is inserted into the packet. The path tags may be weighted.

14 Claims, 12 Drawing Sheets

```
                                    Tag Table    504
                                   +======+========+======+===========+
                                   | tag  | bcast? | port |Termination|
                                   |      |        |      |    bit    |
                                   +======+========+======+===========+
                              +--->| 4532 |   -    |  10  |           |
                              |    +------+--------+------+-----------+
                              |    | 2314 |   -    |  26  |           |
                              |    +------+--------+------+-----------+
                              |    |  .   |   .    |  .   |           |
                              |    |  .   |   .    |  .   |           |
                              |    |  .   |   .    |  .   |           |
                              |    +------+--------+------+-----------+
                              |  +-| 7524 |   x    |  2   |           |
                              |  | +======+========+======+===========+
                              |  |
 Layer 2 MAC Table    502     |  |
+================+=====+=====+|+=====+
| MAC address    | VID | tag | port |
+================+=====+=====+======+
| 000883-123456  |  1  | 23ab|      |
+----------------+-----+-----+------+
| 000883-654321  |  3  | 4532|      |
+----------------+-----+-----+------+
|       .        |  .  |  .  |  .   |
|       .        |  .  |  .  |  .   |
|       .        |  .  |  .  |  .   |
+----------------+-----+-----+------+
| 080009-2468ac  |  1  |  0  |  20  |
+================+=====+=====+======+

Broadcast Portmap Table    506
+=======+==================================+
| index |             portmap              |
+=======+==================================+
|   0   | 00000000000000000001011000011    |
+-------+----------------------------------+
|   1   | 00000000000000000001001000001110 |
+-------+----------------------------------+
|   2   | 00000000000000000001110101011    |<-+
+-------+----------------------------------+
|   .   |                .                 |
|   .   |                .                 |
+-------+----------------------------------+
|   n   | 00000000000000000001110001010    |
+=======+==================================+
```

FIG. 5

```
From entry in
Switch Table
       604
- - - - - - - - - ->
                     +- - - - - - - - -+
                     |                 |
                     |                 |<- - +
                     | hash   606      |
                     | algorithm       |
                     |                 |<- - +
                     +- - - - - - - - -+
                              ^        ^
                              |        |
Tag Table    608              |        |
+------+--------+-------+------+       |
| tag  | bcast? | retag | port |<- - - +
+======+========+=======+======+
| 2332 |   -    |   -   |  10  |<- - - +
+------+--------+-------+------+
| 2314 |   -    |   -   |  78  |   switch 1's tags
+------+--------+-------+------+
| 2309 |   -    |   -   |  23  |<- - - +
+------+--------+-------+------+
| 1904 |   -    |   -   |   5  |
+------+--------+-------+------+
| 1924 |   -    |   -   |   7  |   switch 2's tags
+------+--------+-------+------+
| 1974 |   -    |   -   |   1  |
+------+--------+-------+------+
|  .   |   .    |   .   |   .  |
|  .   |   .    |   .   |   .  |
+------+--------+-------+------+
| 7524 |   x    |   -   |  13  |   switch n's tags
+------+--------+-------+------+
```

FIG. 6B

| Tag | Num Hops | Links |
|---|---|---|
| 0xB201 | 3 | 10,100 |
| 0xB202 | 4 | 100 |
| 0xB203 | 2 | 1000 |
| 0xB204 | 5 | 1000,100 |

FIG. 7

Tag Table 802

| tag | bcast? | retag | port |
|------|--------|-------|------|
| B203 | - | - | 78 |
| B201 | - | - | 10 |
| B203 | - | - | 78 |
| B203 | - | - | 78 |
| B201 | - | - | 10 |
| B202 | - | - | 23 |
| B203 | - | - | 78 |
| B201 | - | - | 10 |
| B204 | - | - | 13 |
| B202 | - | - | 23 | switch 1's tags

FIG. 8

LOAD BALANCING WITH MESH TAGGING

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned." by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Multiple paths between two devices enhances reliability of network communication between the devices by allowing for a redundant (backup) network path to be used between two devices when a primary path fails.

SUMMARY

One embodiment of the invention relates to a method of load balancing traffic in a switching mesh. A packet is received at a switch of the mesh. A MAC destination address is gathered from the packet. An entry in a MAC address table is found with the MAC destination address, and a switch identifier associated with the MAC destination address is obtained. An entry in a switch table is found with the switch identifier, and data associated with the switch identifier is obtained. A hash function is used on field data from the packet to generate a hash value, and the hash value and the associated data are used to generate an index value. An entry in the tag table is found with the index value, and a path tag associated with the index value is obtained. The path tag is inserted into the packet. The path tags may be weighted.

Another embodiment of the invention relates to another method of load balancing traffic with path tagging in a switching mesh. In this method, both a switch identifier and a priority associated with the MAC destination address are obtained from the MAC address table, and both the switch identifier and priority are used to index into the switch table.

Another embodiment of the invention relates to a switching apparatus configured to be a member of a switching mesh. The switching apparatus includes at least a plurality of ports, and a switch control device coupled to the plurality of ports. The switch control device is configured to load balance packetized traffic with path tagging.

BRIEF DESCRIPTION OF THE DRAWINGS

FIG. 5 depicts tables used for basic mesh tagging support in accordance with an embodiment of the invention.

FIGS. 6A and 6B depict tables used for load balancing with a hashing mechanism in accordance with an embodiment of the invention.

FIG. 7 depicts number of hops and link speeds for different tagged paths in an illustrative example.

FIG. 8 depicts a weighted tag table in accordance with an embodiment of the invention.

DETAILED DESCRIPTION

A. Switching Mesh and Path Tagging

Figure 1:
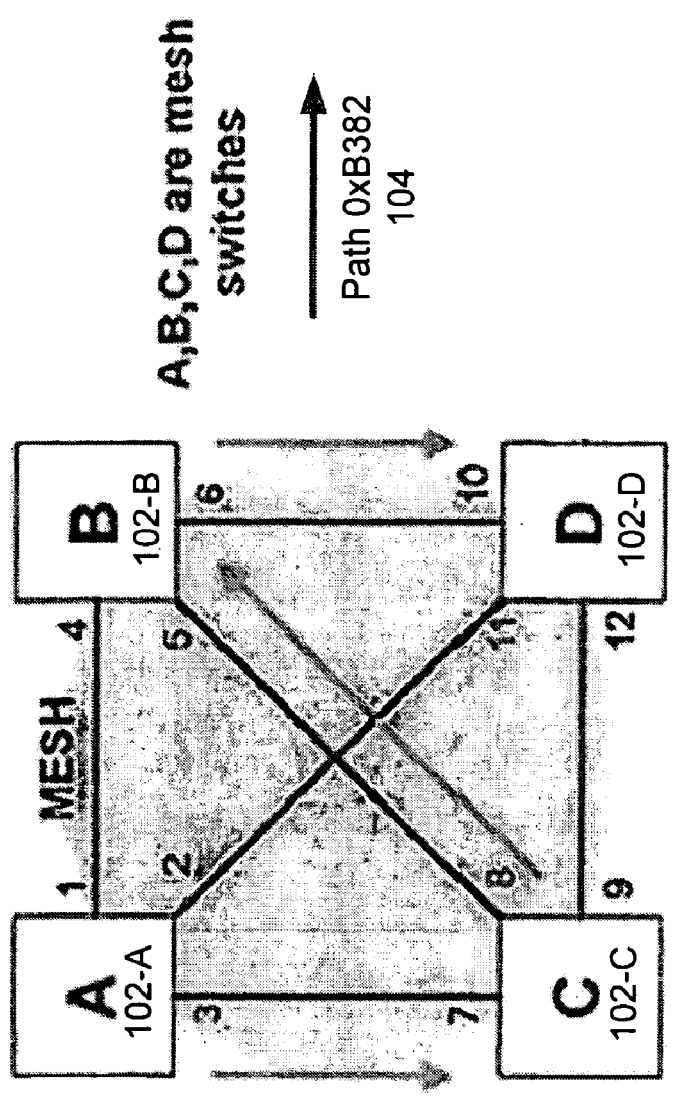
FIG. 1 is a schematic diagram depicting a switching mesh in accordance with an embodiment of the invention.

FIG. 1 is a schematic diagram depicting a switching mesh in accordance with an embodiment of the invention. One example path 104 is shown in FIG. 1. This path 104, designated in this instance as path 0xB382, travels as follows: exits port 3 of switch A 102-A; enters port 7 of switch C 102-C; exits port 8 of switch C 102-C; enters port 5 of switch B 102-B; exits port 6 of switch B 102-B; and enters port 10 of switch D 102-D.

In accordance with an embodiment of the invention, mesh tagging is utilized to advantageously identify paths within the mesh from a source switch to a destination switch. In one implementation, each source/destination pair may be configured with up to fifteen different paths. This is because four bits are used for the path identifier in a path tag and the zero value is considered invalid in this specific implementation. One example of such a path tag is described further below in relation to FIG. 2. Other embodiments may provide a different number of broadcast paths per switch by using a different number of bits for the path identifier. For example, if the path identifier has six bits, then each source/destination pair may be configured with sixty-three different paths.

Figure 2:
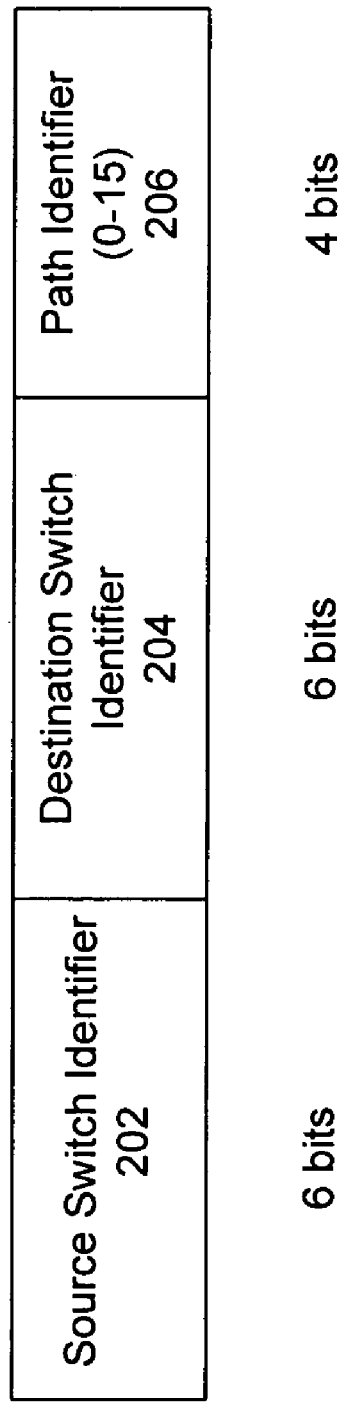
FIG. 2 is a diagram of a path tag in accordance with an embodiment of the invention.

FIG. 2 is a diagram of a path tag in accordance with an embodiment of the invention. The path tag includes a source switch identifier 202, a destination switch identifier 204, and a path identifier 206. In this embodiment, the path tag is sixteen bits in length. In particular, the source switch identifier 202 is six bits long, the destination switch identifier 204 is six bits long, and the path identifier 206 is four bits long. In this implementation, with the switch identifiers being six bits long, sixty-three different switches in the mesh may be distinguished and identified. (The value zero for the switch id being considered an invalid value in this implementation.) With the path identifier being four bits long, fifteen different paths may be identified per source/destination pair. (The value zero for the path id again being considered invalid in this implementation.) Other embodiments may have other lengths for these fields, resulting in different numbers of identifiable switches and paths.

Consider, for example, the mesh depicted in FIG. 1. Path tags of the format depicted in FIG. 2 may be used to identify different paths, for instance, from switch A to switch D. Given that source and destination, each path tag would include an identifier corresponding to switch A in the source switch identifier field 202 and an identifier corresponding to switch D in the destination switch identifier field 204. Distinctive path identifiers, one per path between A and D, would be included in the path identifier field 206.

For instance, a first path may go directly from A to D by exiting port 2 of switch A and entering port 11 of switch D. A second path (not shown) may travel from A to D via switch C by exiting port 3 on switch A, entering port 7 of switch C, exiting port 9 of switch C, and entering port 12 of switch D. And so on for other possible paths. Each path is associated with a unique path identifier.

Consider the case where switch D learns a new MAC address and informs the rest of the mesh of the new MAC address associated with switch D. Switch A can then assign to that MAC address a path tag corresponding to one of the aforementioned paths from A to D (for example, path tag 0xB382 discussed above). Subsequently, every packet destined for that MAC address that enters switch A may be forwarded through the mesh based on that assigned path tag.

In accordance with an embodiment of the invention, each mesh switch knows the entire mesh topology by way of the mesh topology inform protocol discussed below in relation to FIGS. 4A and 4B.

B. Example Packet Switch

Figure 3:
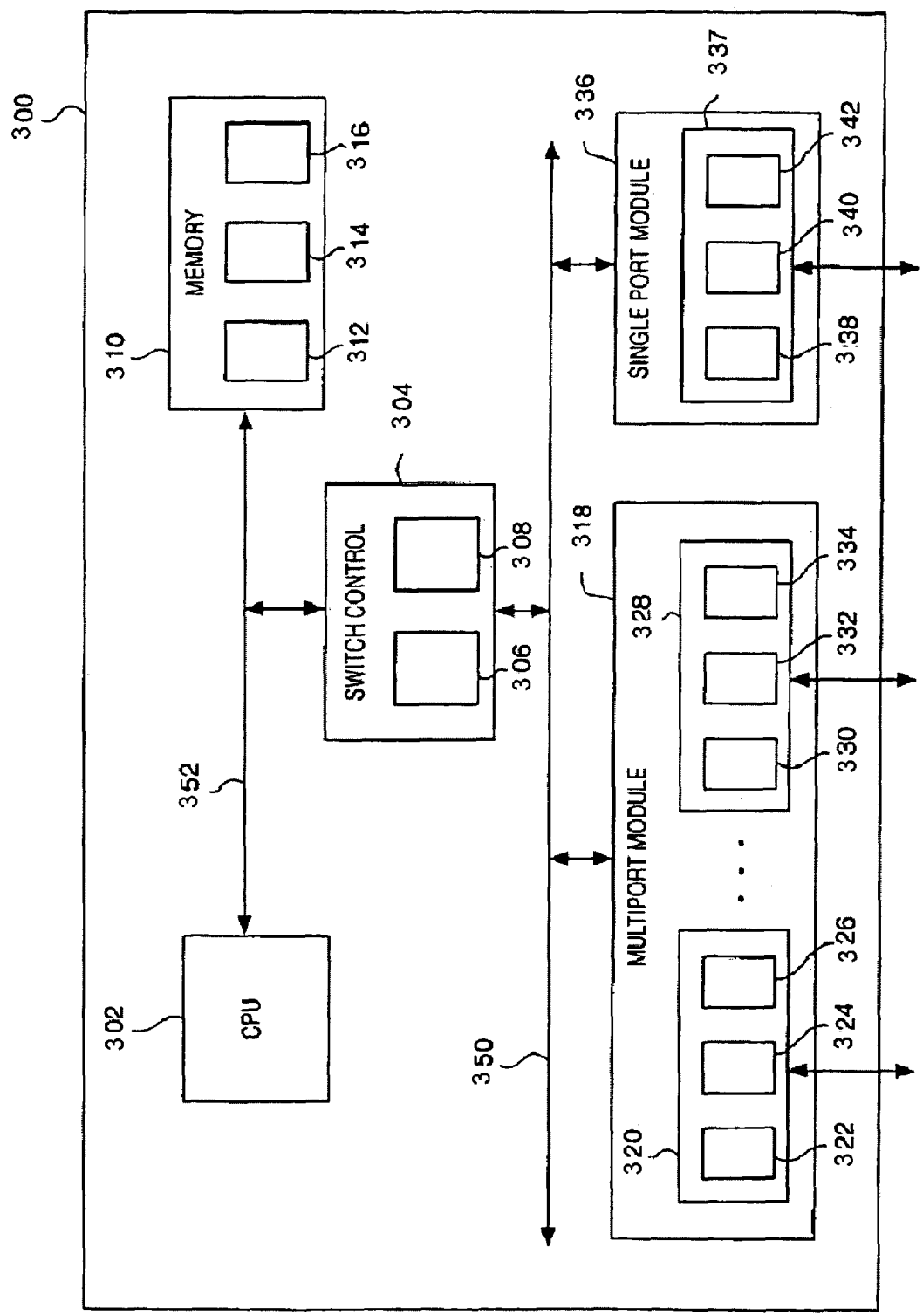
FIG. 3 is a schematic diagram of an example packet switch operable in accordance with an embodiment of the invention.

FIG. 3 is a schematic diagram of an example packet switch 300 operable in accordance with an embodiment of the invention. The specific configuration of packet switches used will vary depending on the specific implementation.

A central processing unit (CPU) 302 performs overall configuration and control of the switch 300 operation. The CPU 302 operates in cooperation with switch control 304, an application specific integrated circuit (ASIC) designed to assist CPU 302 in performing packet switching at high speeds required by modern networks.

The switch control 304 controls the "forwarding" of received packets to appropriate locations within the switch for further processing and/or for transmission out another switch port. Inbound and outbound high speed FIFOs (306 and 308, respectively) are included with the switch control 304 for exchanging data over switch bus 352 with port modules. In accordance with an embodiment of the invention, the switch control ASIC 304 is configured to insert, remove, and analyze a path tag within a fixed location in a packet.

Memory 310 includes a high and low priority inbound queue (312 and 314, respectively) and outbound queue 316. High priority inbound queue 312 is used to hold received switch control packets awaiting processing by CPU 302 while low priority inbound queue 314 holds other packets awaiting processing by CPU 302. Outbound queue 316 holds packets awaiting transmission to switch bus 350 via switch control 304 through its outbound FIFO 308. CPU 302, switch control 304 and memory 310 exchange information over processor bus 352 largely independent of activity on switch bus 350.

The ports of the switch may be embodied as plug-in modules that connect to switch bus 350. Each such module may be, for example, a multi-port module 318 having a plurality of ports in a single module or may be a single port module 336. A multi-port module provides an aggregate packet switch performance capable of handling a number of slower individual ports. For example, in one embodiment, both the single port module 336 and the multi-port module 318 may be configured to provide, for example, approximately 1 Gbit per second packet switching performance. The single port module 336 therefore can process packet switching on a single port at speeds up to 1 Gbit per second. The multi-port module 318 provides similar aggregate performance but distributes the bandwidth over, preferably, eight ports each operating at speeds, for example, of up to 100 Mbit per second. These aggregated or trunked ports may be seen as a single logical port to the switch.

Each port includes high speed FIFOs for exchanging data over its respective port. Specifically, each port, 320, 328, and 337, preferably includes an inbound FIFO 322, 330, and 338, respectively for receiving packets from the network medium connected to the port. Further, each port 320, 328, and 337, preferably includes a high priority outbound FIFO 324, 332, and 340, respectively, and a low priority outbound FIFO 326, 334, and 342, respectively. The low priority outbound FIFOs are used to queue data associated with transmission of normal packets while the high priority outbound FIFO is used to queue data associated with transmission of control packets. Each module (318 and 336) includes circuits (not specifically shown) to connect its port FIFOs to the switch bus 350.

As packets are received from a port, the packet data is applied to the switch bus 350 in such a manner as to permit monitoring of the packet data by switch control 304. In general, switch control 304 manages access to switch bus 350 by all port modules (i.e., 318 and 336). All port modules "listen" to packets as they are received and applied by a receiving port module to switch bus 350. If the packet is to be forwarded to another port, switch control 304 applies a trailer message to switch bus 350 following the end of the packet to identify which port should accept the received packet for forwarding to its associated network link.

C. Topology Protocols

1. Topology Inform Protocol

Figure 4A:
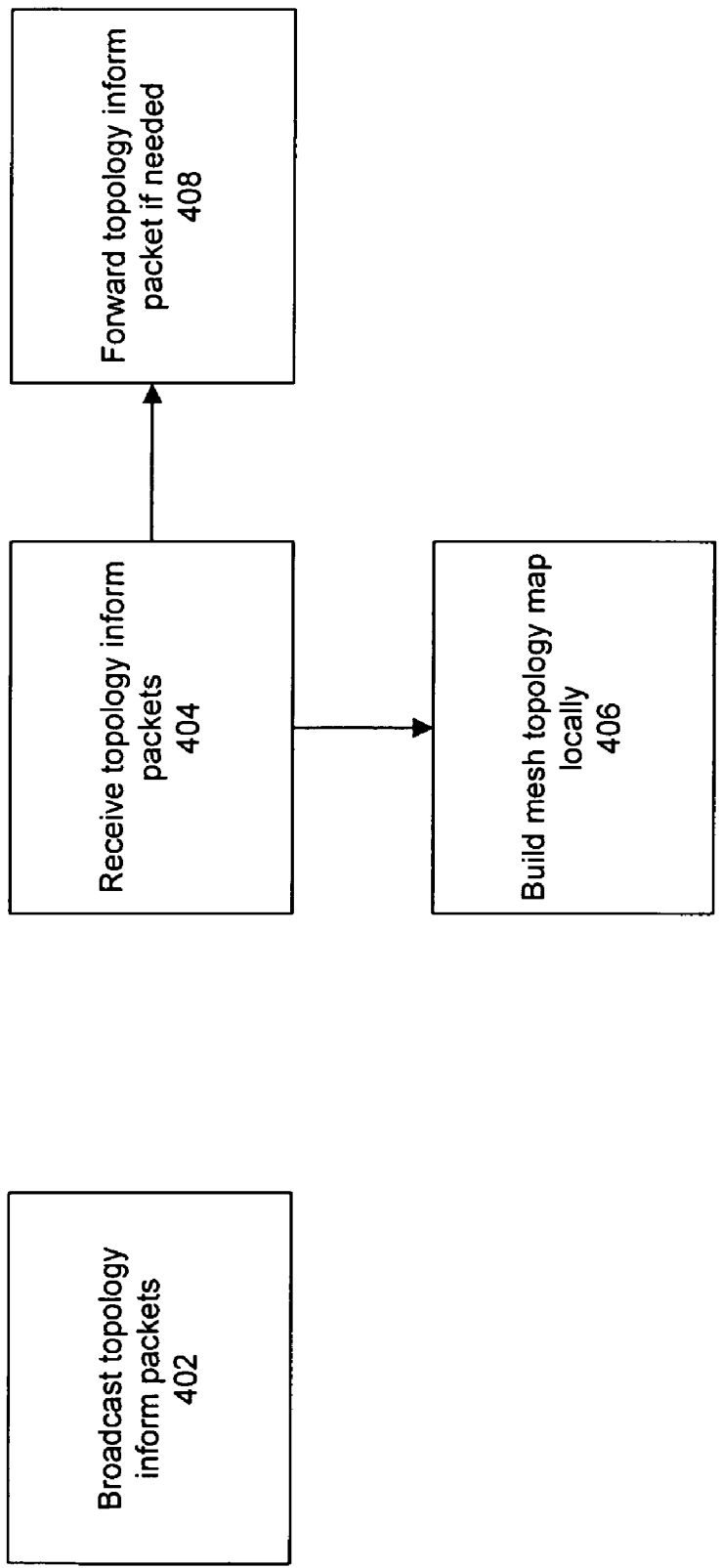
FIG. 4A is a block diagram depicting a method of building local mesh topology maps in accordance with an embodiment of the invention.

FIG. 4A is a block diagram depicting a method of building local mesh topology maps in accordance with an embodiment of the invention. The depicted method uses a mesh topology inform protocol.

Preliminarily, a switch identifier (ID) negotiation protocol may be used to enable all switches in the mesh to have a unique ID within the mesh. In one specific implementation, the switch ID may be a 64-bit value stored in an eight byte (64 bit) marked bits field. In one aspect of the switch ID negotiation protocol, new switches that enter the mesh cannot use a switch ID which is currently being used by a switch that is already in the switch ID negotiation completed state. Alternatively, the switch IDs may be chosen by user configuration.

Once a switch has negotiated a switch ID, the switch may broadcast 402 topology inform packets to other switches belonging to the mesh. In one example, the topology inform packet may include the following information: switch ID; number of mesh links; local port number per mesh link; neighbor switch per mesh link; and neighbor switch port number per mesh link. For example, in the mesh depicted in FIG. 1, switch D may inform the rest of the mesh of: its switch ID; that it has three mesh ports numbered 10, 11, and 12; and that these ports are connected to port 6 of switch B, port 2 of switch A, and port 9 of switch C, respectively. In one embodiment, the topology inform packets may be broadcast out of all established port periodically or intermittently, such as once per minute or some other period.

The topology inform packets are received 404 by a mesh switch from other mesh switches. From the information in the topology inform packets received, a mesh topology map may be built 406 locally at each mesh switch.

The receiving mesh switch may also forward 408 the topology inform packets to neighboring mesh switches, if such forwarding is determined to be needed. In one embodiment, the forwarding mechanism may operate by using a multiple-bit field in the topology inform packet where each bit corresponds to a switch ID. If a switch has already seen this packet, then the bit may be set (otherwise, the bit should be cleared). If the bit corresponding to the neighbor mesh switch is already set, then the switch knows not to forward the packet to that neighbor. In another embodiment, a multiple-bit sequence number may be used in the topology inform packet. Switches that receive a topology inform packet would then check the sequence number to determine if it has already seen this packet. Only if the switch has not seen this packet before, will it update its information and forward the packet out of all mesh ports (other than the port connected to the source switch).

2. Topology Update Protocol

In accordance with an embodiment of the invention, a link state may be determined with a handshake mechanism between both switches. The handshake may be performed periodically (for example, every three to five minutes). The handshake may comprise a two-way handshake which utilizes request and acknowledgement messages. Alternatively, a three-way handshake may be used to indicate both switches agree upon the link establishment between them. The three-way handshake may comprise the following communication sequence: 1) first switch sends a link state request message (REQ packet) to second switch on link between them; 2) second switch receives the request message and returns a first link state acknowledgement message (ACK packet) to the first switch on the same link; and 3) first switch receives the acknowledgement message and returns a second link state acknowledgment message (REQ ACK or ACK2 packet).

Figure 4B:
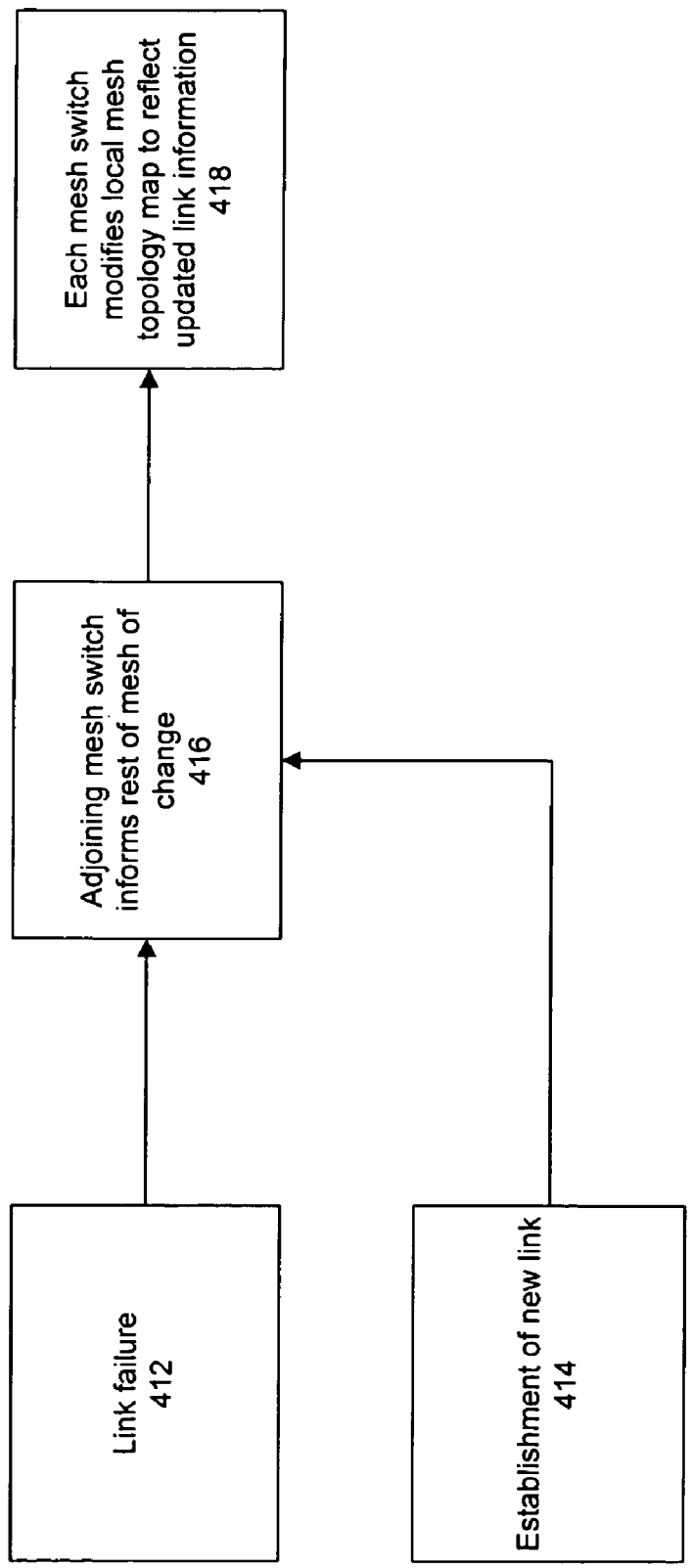
FIG. 4B is a block diagram depicting a method of maintaining local mesh topology maps in accordance with an embodiment of the invention.

FIG. 4B is a block diagram depicting a method of maintaining local mesh topology maps in accordance with an embodiment of the invention. Upon a link failure 412 or establishment 414 of a new mesh link, a mesh switch adjoining to the failed or new link will inform 416 the rest of the mesh of this change in the topology. This may be performed by using a topology update protocol. Like the topology inform protocol, the topology update protocol packets may be flooded to all mesh ports or sent along a broadcast path. To speed up processing, the topology update protocol packets may contain only information of only the links that have been entered or exited the established state of the topology. Using the received information, each mesh switch will modify 418 its mesh topology map to reflect the updated link information.

D. Basic Mesh Tagging Support

We now discuss the hardware and software to support path tagging in the switching mesh.

First, as discussed above in relation to FIG. 3, the switch control ASIC 304 of the packet switch is configured to insert, remove, and analyze a path tag within a fixed location in a packet.

Second, a new field is added to the switch's layer 2 MAC address table. This new field will be the path tag (for example, the 16 bit path tag described above in relation to FIG. 2) that is associated with each MAC address. An example of such a MAC table 502 is depicted in FIG. 5, wherein the fields shown include the MAC address, associated VLAN identifier (VID), associated path tag, and port. Note that a port is not needed in this table 502 if there is a valid tag in the tag field.

Third, a tag table is added for use by the switching hardware. An example of such a tag table 504 and its relation to the MAC table 502 are shown in FIG. 5. The tag table 504 contains the correlation between tags and ports. In accordance with one embodiment, the tag table 504 also includes a bit that indicates whether the entry is a broadcast path entry or a normal unicast path entry. The tag table 504 may be configured to include a termination bit. The termination bit indicates whether the path of the tag terminates on the local switch. This advantageously allows to switch to rapidly determine that it has to strip out the tag and forward the packet. Although this could also be done using a look-up, having the termination bit saves time.

Fourth, a broadcast portmap table is added for use by the switching hardware. An example of such a broadcast portmap table 506 and its relation to the tag table 502 are shown in FIG. 5. The broadcast portmap table 506 contains the portmap for the broadcast paths for each mesh switch.

As shown in the diagram of FIG. 5, the tag value within the layer 2 MAC table 502 refers to an entry within the tag table 504. If the tag entry has the broadcast (bcast?) flag set, then the port field within the entry is an index into the broadcast portmap table 506.

The following are rules for switching packets with mesh tagging in accordance with an embodiment of the invention. As described below, the rules depend on specific characteristics of the received packets. Note, the mesh is a member of all VLANs, so all data packets will contain an 802.1 Q VLAN tag.

1) Unknown Unicast DA on Non-Mesh Port

When a packet with an unknown unicast destination address (DA) is received on a non-mesh port of a mesh switch, the switch control will forward the packet out of all non-mesh ports on the VLAN on which it was received. In addition, the switch control will insert a broadcast map tag to the packet and send the packet on the broadcast path. The switch control will also send a copy of the packet up to the switch CPU.

2) Known Unicast DA on Non-Mesh Port

When a packet with a known unicast DA is received on a non-mesh port of a mesh switch, the switch control will look up the MAC address entry in the layer 2 table. The tag field within the MAC entry is looked at to determine whether the destination is on a non-mesh or mesh port. If the tag is zero, then the MAC address is located on a non-mesh port. In that case, the packet will be switched out the appropriate port. If the tag is non-zero, then the MAC address is located on a mesh port. In that case, the switch control takes the tag field and uses it to reference into the tag table. The switch control will then insert the tag value into the packet and forward the packet out of the port associated with that tag value in the tag table.

3) Unknown Unicast SA on Non-Mesh Port

When a switch receives a packet with an unknown unicast source address (SA) on a non-mesh port (i.e. a "learn" packet), a tag will be added to the packet and the packet will be forwarded through the mesh, depending on its destination. If the packet has an unknown DA, then the operation procedure discussed above in rule 1) will be followed. If the packet has a known DA, then the operation procedure discussed above in rule 2) will be followed. The switch control will also send a copy of the packet to the CPU to learn the new source MAC address. Also, a MAC inform packet will be sent to every other switch in the mesh to inform them that this new MAC SA is owned by this switch.

4) Broadcast/Multicast on Non-Mesh Port

When a switch receives a broadcast or multicast packet on a non-mesh port, the switch will insert a broadcast path tag into the packet and forward the packet out that broadcast path to the other mesh switches. The packet will also be forwarded out all non-mesh ports on the VLAN on which the packet was received.

5) Unknown Tag on Mesh Port

When a switch receives an unknown tag on a mesh port due to a synchronization problem or a bug, the switch will forward the packet up to the CPU. The packet will not be forwarded out any ports. The CPU will initiate a querying protocol mechanism with a neighbor switch to resolve the unknown tag.

6) Unicast with Known Tag on Mesh Port

When a switch receives a unicast packet with a known tag on a mesh port, the switch will look up the tag in the tag table and forward the packet out the port associated with the tag in the tag table. If the termination bit in the tag table indicates that the path of the tag terminates at this switch, then the switch will strip the tag and forward the packet out of the associated port.

In the general form of mesh tagging, a mesh tagging capable switch will assign a MAC address to a given tag. This is rather static and will only change if the path is broken or if the address is aged.

7) Broadcast/Multicast with Known Tag on Mesh Port

When a switch receives a broadcast or multicast packet with a known tag on a mesh port, the switch will perform the following two operations. a) The switch will lookup the tag within the tag table, and forward the packet out all non-mesh ports that are part of the appropriate 802.1Q VLAN, which is determined from the standard 802.1Q tag. Note, multicast packets may be filtered based on other hardware multicast filters. These filters may be setup by IGMP, PIM, and so on.

E. Load Balancing with Hashing Mechanism

In accordance with an embodiment of the invention, mesh tagging is used to provide advantageous methods of load balancing. As described above, each mesh switch has multiple unique paths to every other mesh switch. The switch control ASIC hardware circuitry may be modified so that advantageous forms of load balancing are achieved using these multiple unique paths.

Figure 6A:
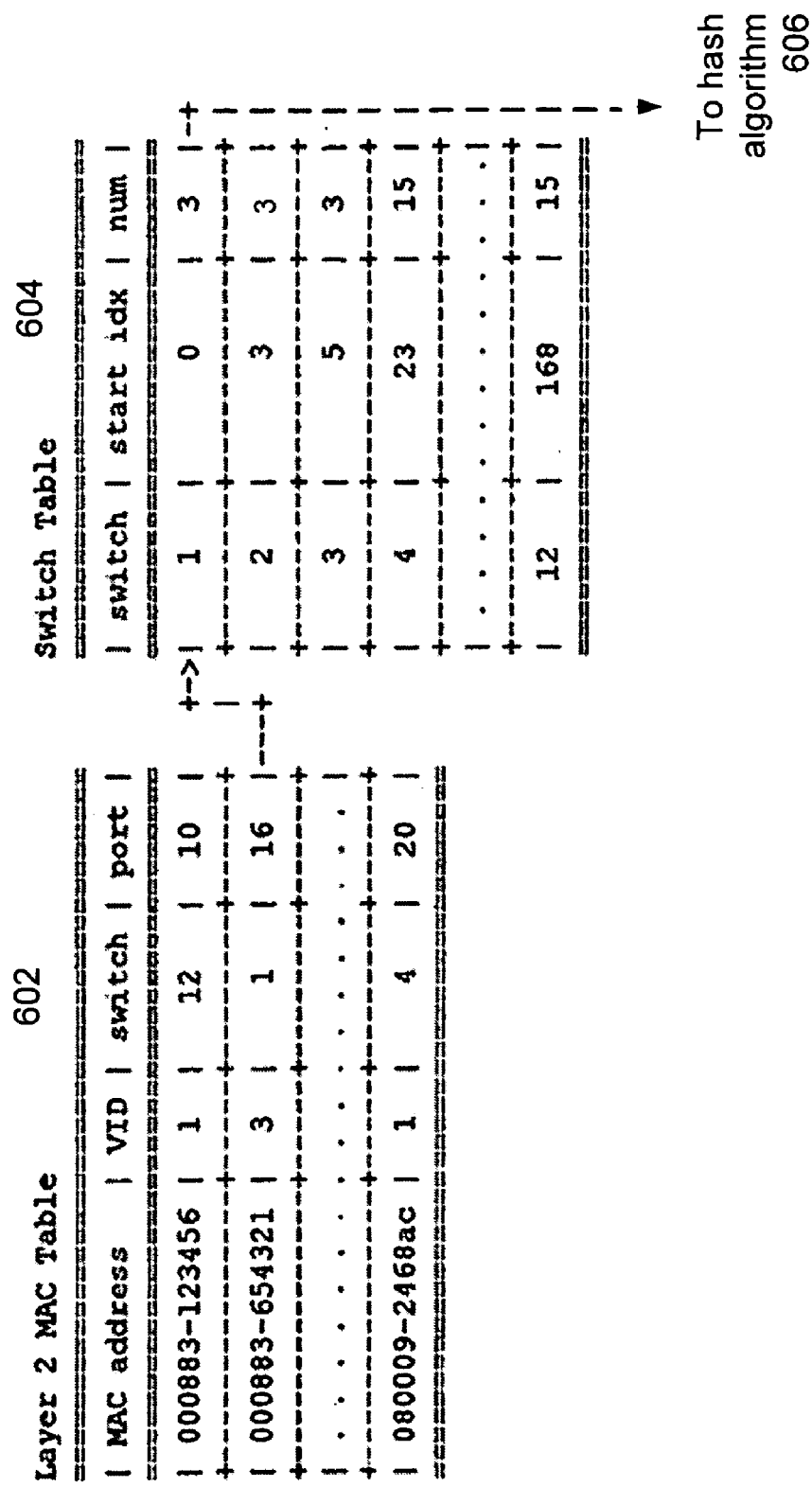

Load balancing with a hashing mechanism is now discussed in conjunction with FIGS. 6A and 6B. FIGS. 6A and 6B depict a layer 2 MAC table 602, a switch table 604, a hash algorithm 606, and a tag table 608.

The MAC table 602 has fields including MAC address, VID, switch, and port. Compared with the MAC table 502 of FIG. 5, this MAC table 602 includes the switch field, instead of the tag field. The switch table 604 has fields including a switch index (switch), a tag table start index (start idx), and the total number of tags associated with this switch (num). Also, the entries within the tag table are preferably grouped by switch number.

The load balancing with hashing mechanism works as follows.

First, when a known unicast DA packet enters the mesh on a non-mesh port, the switch control looks for the packet's MAC destination address and VID in the layer 2 MAC table 602.

Second, using the switch field found in the layer 2 MAC table 602, the switch control will get the switch identifier that indexes to the switch table 604.

Third, the switch control then applies a hashing algorithm 606. The hash function of some of the packet fields is used in order to generate a hash value. In one example, the hash function for IP packets may depend on packet fields as follows: hash (packet_MAC_SA, packet_MAC_DA, packet_IP_SA, packet_IP_DA), where packet_MAC_SA=the MAC source address of the packet, packet_MAC_DA=the MAC destination address of the packet, packet_IP_SA=the Internet protocol (IP) source address of the packet, and packet_IP_DA=the Internet protocol (IP) destination address of the packet. (Of course, non-IP packets would require use of a different hash function.) Using these various packet attributes should generate a unique hash value for different types of traffic streams. This hashing algorithm 606 may also be extended to include TCP/UDP port numbers.

Fourth, the switch control generates the hash index by taking the hash value and dividing the hash value by the total number of tags associated with the switch. Finally, the switch control adds the start index to the hash index to generate the index into the tag table 608. The associated path tag will be used to transmit the packet through the switching mesh. This will distribute traffic along a different path based on the traffic stream.

F. Load Balancing with Weighted Hashing Mechanism

In accordance with an embodiment of the invention, weights may be added to particular tags in the hashing algorithm. For example, if a specific path is known to have 1 Gbps (gigabit per second) ports, while other paths are made up of slower 100 Mbps (megabits per second) or 10 Mbps ports.

FIG. 7 depicts number of hops and link speeds for different tagged paths in an illustrative example. In this example, four tagged paths are shown and are identified by the tags 0xB201, 0xB202, 0xB203, and 0xB204. These four paths include 3, 4, 2, and 5 hops, respectively. The path 0xB201 includes links with speeds 10 Mbps and 100 Mbps, the path 0xB202 includes links with speeds 100 Mbps, the path 0xB203 includes links with speeds 1 Gbps, and the path 0xB204 includes links with speeds 1 Gbps and 100 Mbps.

In this hypothetical example, it may be determined that the order of tagged paths from most utilized (or highest probability of utilization) to least utilized (or least probability of utilization) is 0xB203, 0xB201, 0xB202, and 0xB204. With a particular weight determined and assigned to each tagged path, the switch control may implement the weighted load balancing by having multiple of the same tag entries within the tag table in order to provide the flexibility to adjust the likelihood that each tag is chosen and used. In order to support this feature, there should, practically speaking, be at least 3 to 5 times more entries in the tag table than the number of tags. The same hashing mechanism may be used in order to find an index into the tag table, but the better (or favored) paths would be given a higher probability of being chosen (by having a greater number of entries for the better paths).

An example of such a weighted tag table 802 is depicted in FIG. 8. It is seen in FIG. 8 that tag 0xB203 is most likely to be chosen since there are four entries of that tag. Tag 0xB201 is second most likely to be chosen since there are three entries of that tag. Tag 0xB202 is third most likely to be chosen since there are two entries of that tag. Finally, tag 0xB204 is least likely to be chosen since there is only one entry of that tag.

The weighted hashing mechanism solution to load balancing may also be applied to broadcast and multicast packets received on a non-mesh port. Note that this solution is not to be used when packets are received on a mesh port because those packets will simply be switched based on the tag within the packet. For packets received on mesh ports, the switch control will simply find the tag in the tag table and send it out the associated port. Note that the weighting applied may be a function of the links speeds, number of links, and latency measurements of the tagged mesh paths.

G. Load Balancing with Priority-Based Weighted Hashing Mechanism

In many network environments, traffic streams are not all given the same priority. For instance, broadcast traffic is given a low priority, while voice-over-IP (VoIP) traffic is typically given a high priority (so as to ensure that VoIP phone calls are clear and not choppy). As described in the following, mesh tagging may be applied as a technique for load balancing in order to give select traffic streams paths of greater weight.

Figure 9A:
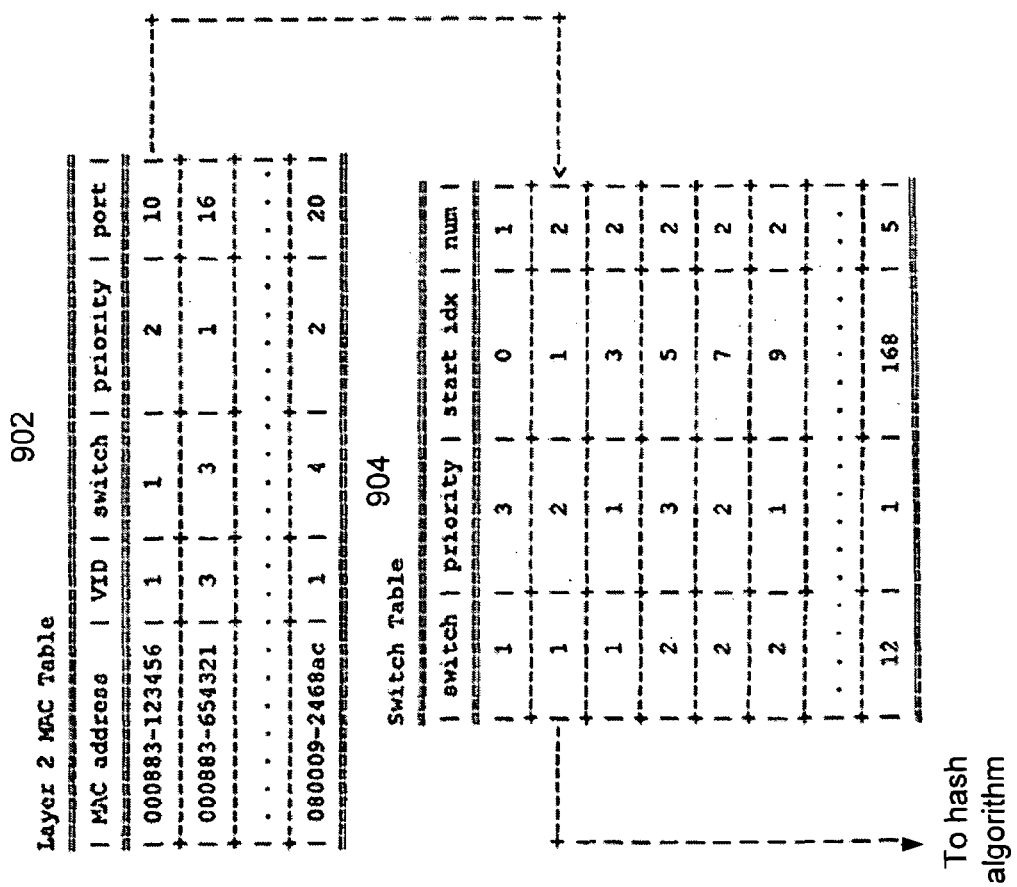
FIGS. 9A and 9B depict tables used for load balancing with a priority-based weighted hashing mechanism in accordance with an embodiment of the invention.
Figure 9B:
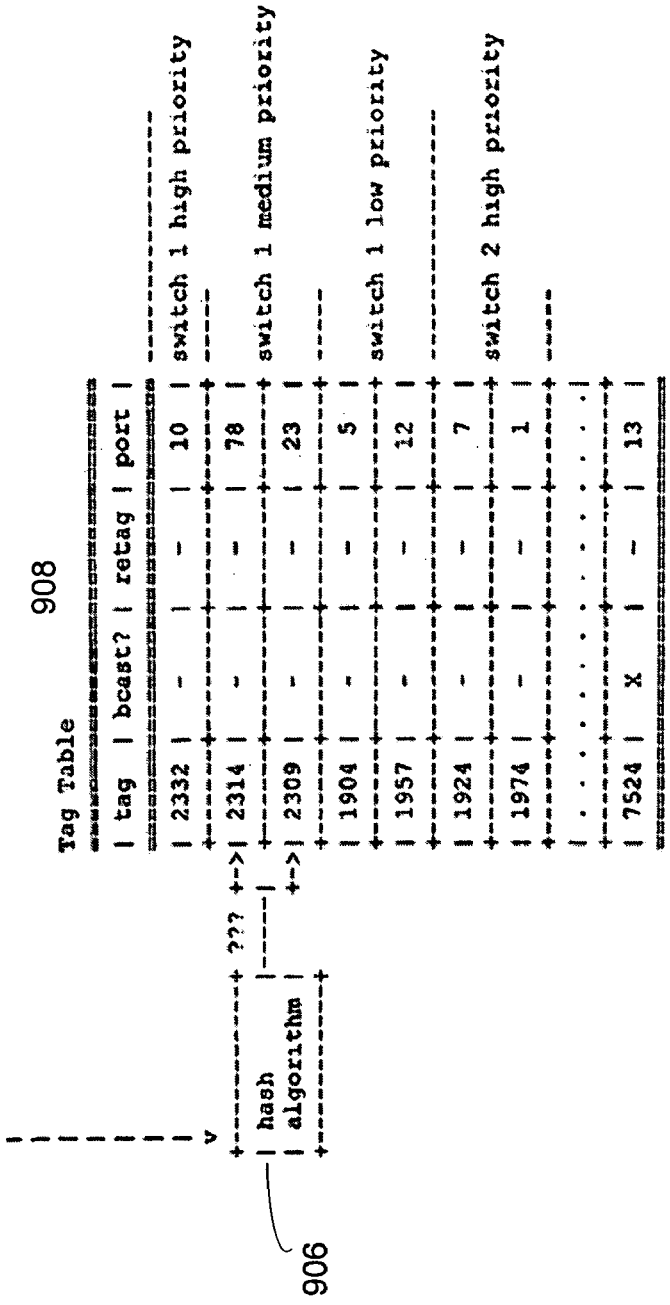

Load balancing with a priority-based weighted hashing mechanism is now discussed in conjunction with FIGS. 9A and 9B.

FIGS. 9A and 9B depict a layer 2 MAC table 902, a switch table 904, a hash algorithm 906, and a tag table 908. The MAC table 902 has fields including MAC address, VID, switch, priority, and port. The priority field is normally present in layer 2 MAC tables. The switch table 904 has fields including a switch index (switch), a priority field, a tag table start index (start idx), and the total number of tags associated with this switch (num). Also, the entries within the tag table are preferably grouped by switch number. Compared with the switch table 604 of FIG. 6A, the priority field is added to this switch table 904 of FIG. 9a. The switch table 904 of FIG. 9A will also be larger than the comparable switch table 604 of FIG. 6A. The hash algorithm 906 and tag table 908 of FIG. 9B may be same or similar to those of FIG. 6B.

The load balancing with priority-based hashing mechanism works as follows.

First, when a known unicast DA packet enters the mesh on a non-mesh port, the switch control looks for the packet's MAC destination address and VID in the layer 2 MAC table 902.

Second, using both the switch identifier and priority for that MAC table entry, the switch control will index into the switch table 904. This differs from the load balancing method discussed in relation to FIGS. 6A and 6B, because in this case both switch identifier and priority numbers, not only the switch number, are used to index into the switch table 904.

Third, the switch control then applies a hashing algorithm 906. The hash function of some of the packet fields is used in order to generate a hash value. In one example, the hash function for IP packets may depend on packet fields as follows: hash (packet_MAC_SA, packet_MAC_DA, packet_IP_SA, packet_IP_DA), where packet_MAC_SA=the MAC source address of the packet, packet_MAC_DA=the MAC destination address of the packet, packet_IP_SA=the Internet protocol (IP) source address of the packet, and packet_IP_DA=the Internet protocol (IP) destination address of the packet. (Of course, non-IP packets would require use of a different hash function.) Using these various packet attributes should generate a unique hash value for different types of traffic streams. This hashing algorithm 906 may also be extended to include TCP/UDP port numbers.

Fourth, the switch control generates the hash index by taking the hash value and dividing the hash value by the total number of tags associated with the switch. Finally, the switch control adds the start index to the hash index to generate the index into the tag table 908. The associated path tag will be used to transmit the packet through the switching mesh.

The above disclosed systems and methods provide the following advantages over the conventional systems and methods. The conventional systems and methods do not perform hashing in order to load balance traffic through the switching mesh. In addition, this hashing solution is more efficient in that it may utilize all the available paths through the mesh. Here, the hashing solution may be configured to utilize all paths based on the hashing algorithm's ability to normalize the distribution of assigned paths.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of load balancing traffic with path tagging in a switching mesh, the method comprising:
   receiving a packet at a switch of the mesh;
   getting a MAC destination address from the packet;
   finding an entry in a MAC address table with the MAC destination address;
   obtaining a switch identifier associated with the MAC destination address;
   finding an entry in a switch table with the switch identifier;
   obtaining data associated with the switch identifier, wherein the associated data includes a start index and a total number of tags associated with the switch identifier;
   using a hash function on field data from the packet to generate a hash value;
   using the hash value and the associated data to generate an index value;
   finding an entry in the tag table with that index value;
   obtaining a path tag associated with the index value; and
   inserting the path tag into the packet.

2. The method of claim 1, wherein the packet is received on a non-mesh port of the switch.

3. The method of claim 2, wherein the packet includes a unicast MAC destination address that is found in the MAC address table.

4. The method of claim 1, wherein the hash function depends on a MAC source address and a MAC destination address of the packet.

5. The method of claim 4, wherein the hash function further depends on an IP source address and an IP destination address of the packet.

6. The method of claim 5, wherein the hash function depends on TCP/UDP port numbers.

7. The method of claim 1, wherein the index value is generated by dividing the hash value by the total number of tags associated with the switch identifier and then adding the start index.

8. The method of claim 1, further comprising:
obtaining a port number associated with the index value in the tag table; and
transmitting the packet from that port number.

9. A method of load balancing traffic with path tagging in a switching mesh, the method comprising:
receiving a packet at a switch of the mesh;
getting a MAC destination address from the packet;
finding an entry in a MAC address table with the MAC destination address;
obtaining a switch identifier associated with the MAC destination address;
finding an entry in a switch table with the switch identifier;
obtaining data associated with the switch identifier;
using a hash function on field data from the packet to generate a hash value;
using the hash value and the associated data to generate an index value;
finding an entry in the tag table with that index value;
obtaining a path tag associated with the index value; and
inserting the path tag into the packet,
wherein the path tags are weighted, and
wherein weighting is accomplished by including a variable number of a same path tag in the tag table, wherein a greater number of the same path tag corresponds to a greater weight for that tag.

10. A method of load balancing traffic with path tagging in a switching mesh, the method comprising:
receiving a packet at a switch of the mesh;
getting a MAC destination address from the packet;
finding an entry in a MAC address table with the MAC destination address;
obtaining both a switch identifier and a priority associated with the MAC destination address;
finding an entry in a switch table with both the switch identifier and the priority;
obtaining data associated with both the switch identifier and the priority;
using a hash function on field data from the packet to generate a hash value;
using the hash value and the associated data to generate an index value;
finding an entry in the tag table with that index value;
obtaining a path tag associated with the index value; and
inserting the path tag into the packet,
wherein the associated data includes a start index and a total number of tags associated with the switch identifier.

11. The method of claim 10, wherein the index value is generated by dividing the hash value by the total number of tags associated with the switch identifier and then adding the start index.

12. The method of claim 10, further comprising:
obtaining a port number associated with the index value in the tag table; and
transmitting the packet from that port number.

13. A switching apparatus configured to be a member of a switching mesh, the apparatus comprising:
a plurality of ports;
a switch control device coupled to the plurality of ports, wherein the switch control device is configured to load balance packetized traffic with path tagging;
a layer 2 MAC address table;
a switch table; and
a tag table, wherein each said table is configured to be accessed by the switch control device; and
a hash algorithm for generating an index into the tag table,
wherein a switch identifier is obtained from the MAC address table, and wherein both a start index and a total number of tags associated with the switch identifier are obtained from the switch table.

14. The apparatus of claim 13, wherein the hash algorithm is configured to generate the index into the tag table by applying a hash function to select field data from a packet to generate a hash value, dividing the hash value by the total number of tags associated with a switch identifier, and then adding the start index.

* * * * *